Figure 1:
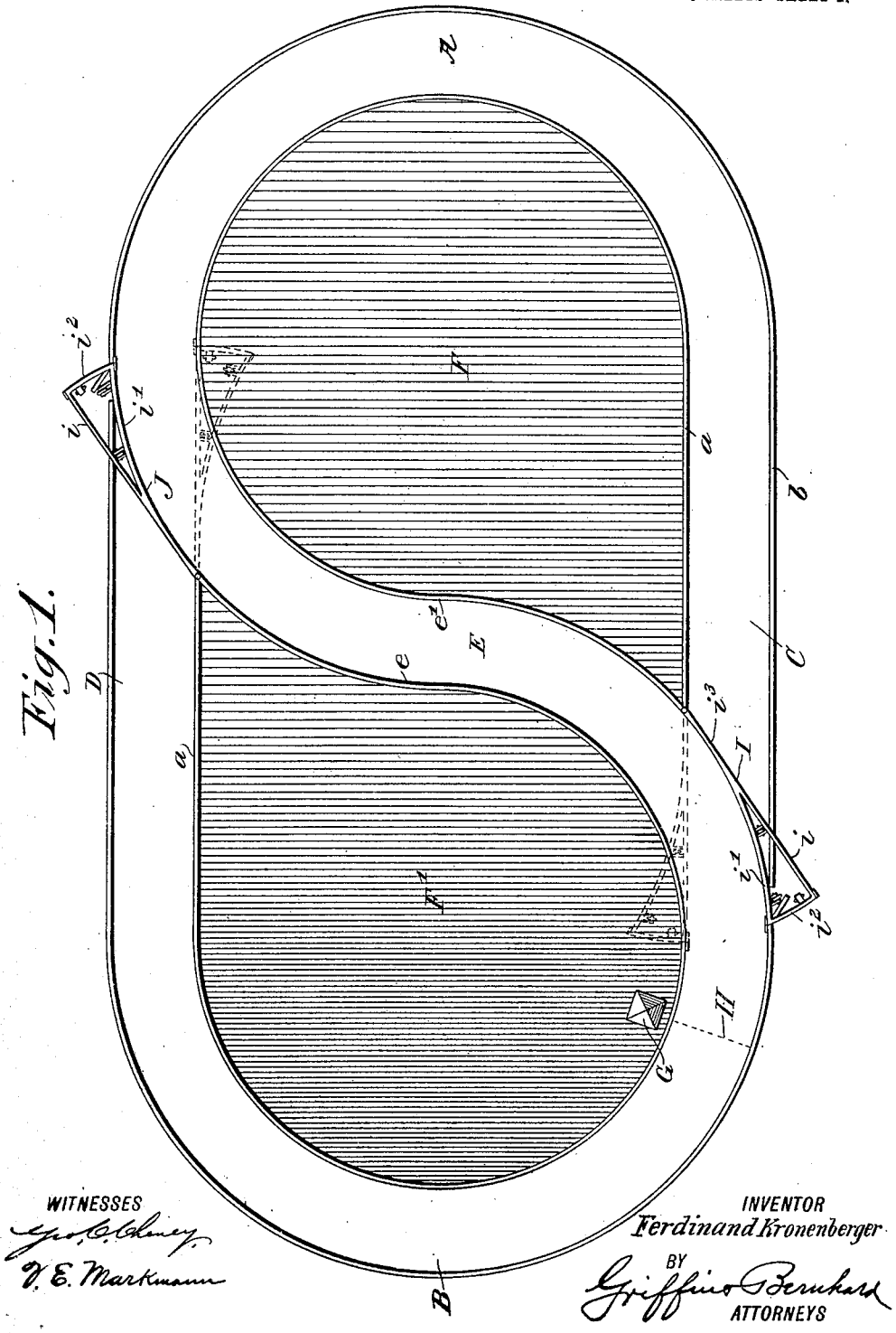

F. KRONENBERGER.
RACE COURSE.
APPLICATION FILED JULY 8, 1908.

920,346.

Patented May 4, 1909.
5 SHEETS—SHEET 1.

WITNESSES

INVENTOR
Ferdinand Kronenberger
BY
ATTORNEYS

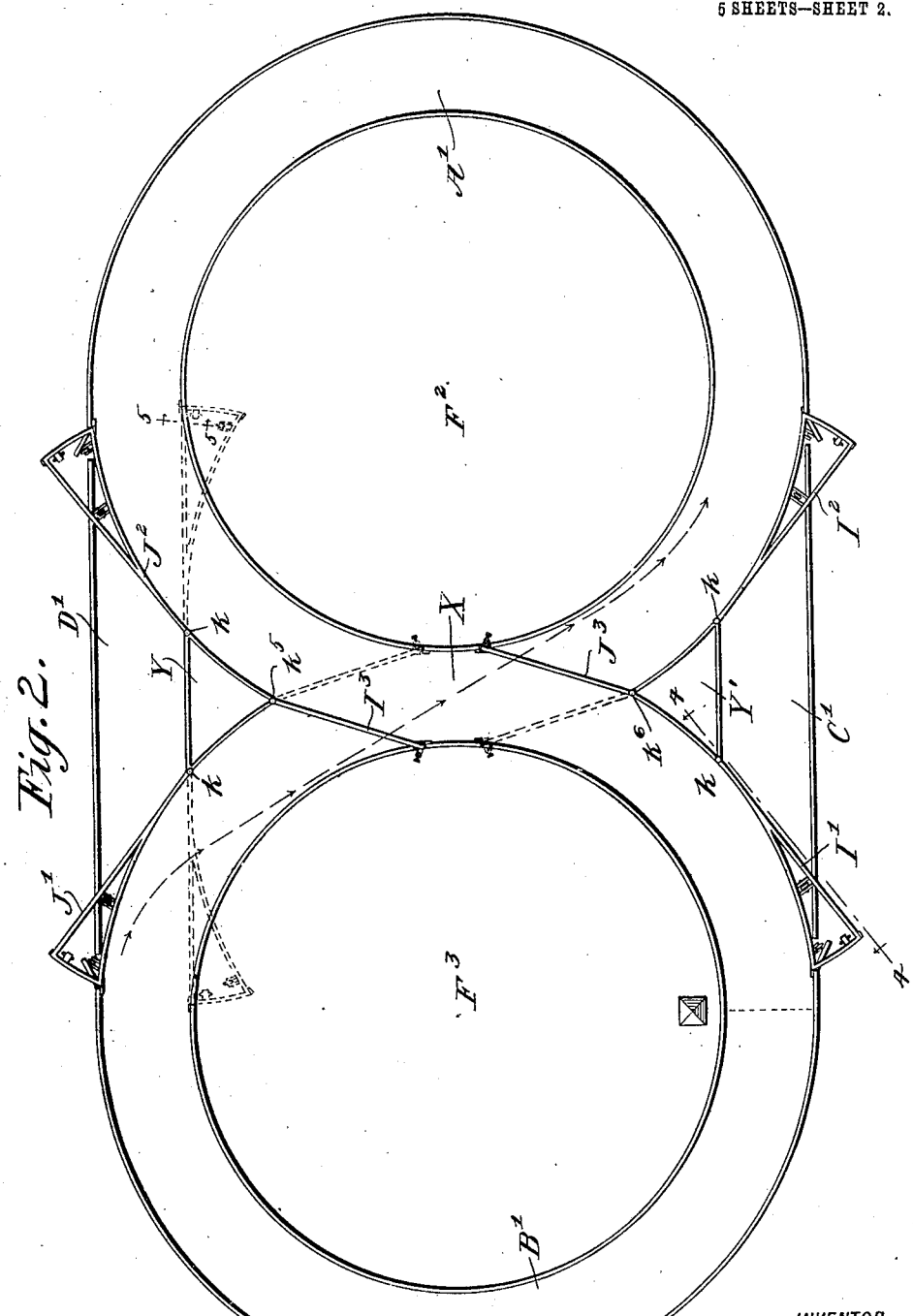

F. KRONENBERGER.
RACE COURSE.
APPLICATION FILED JULY 8, 1908.
920,346.
Patented May 4, 1909.
5 SHEETS—SHEET 3.
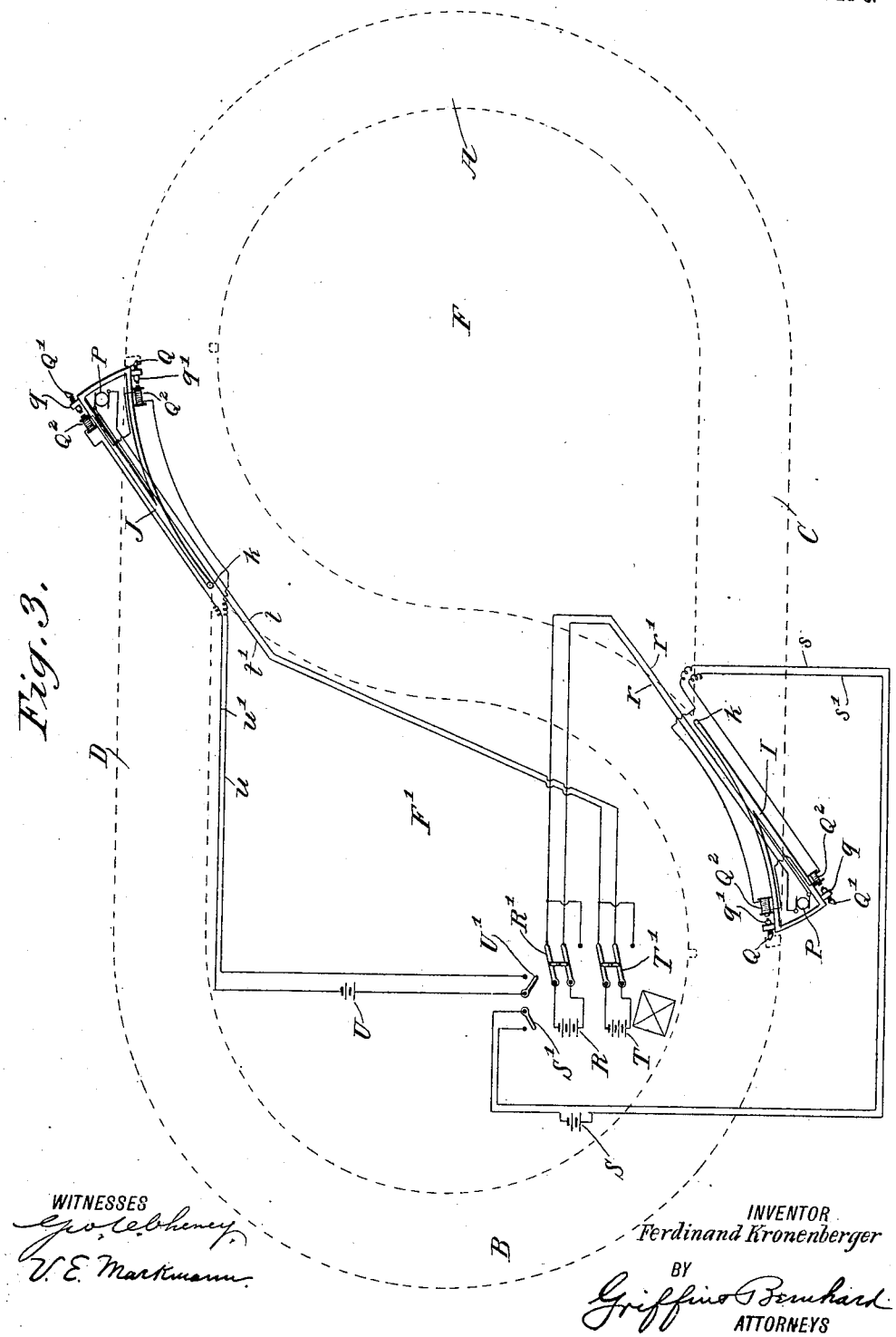
WITNESSES
INVENTOR
Ferdinand Kronenberger
BY
ATTORNEYS F. KRONENBERGER.
RACE COURSE.
APPLICATION FILED JULY 8, 1908.
920,346.
Patented May 4, 1909.
5 SHEETS—SHEET 4.
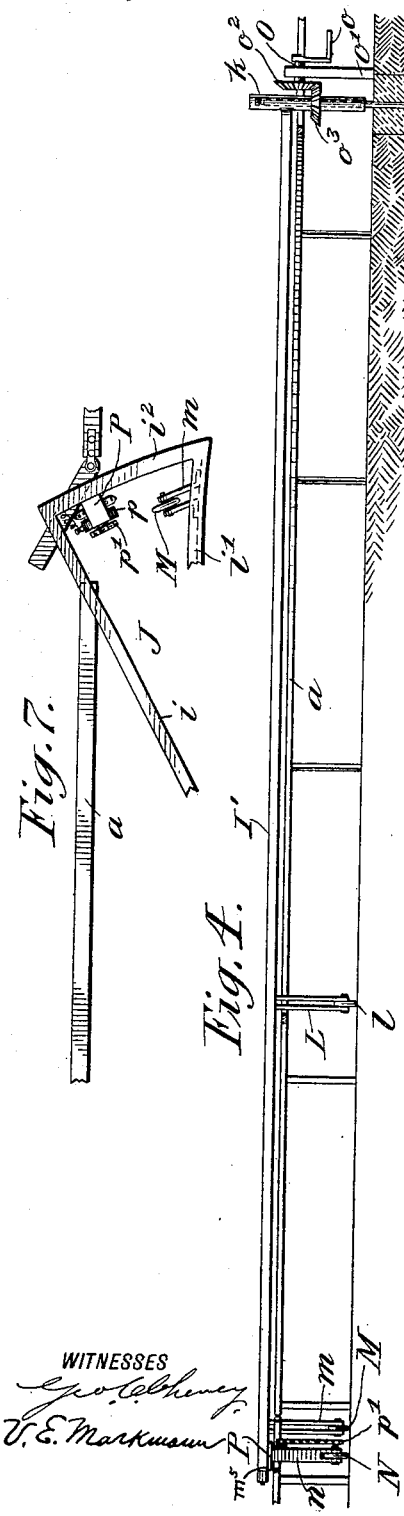
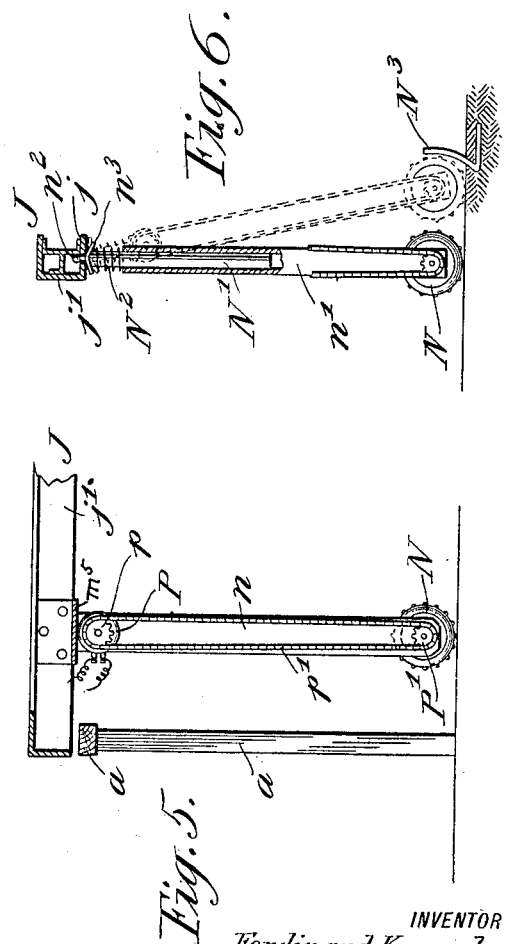
WITNESSES
INVENTOR
Ferdinand Kronenberger
BY
ATTORNEYS F. KRONENBERGER.
RACE COURSE.
APPLICATION FILED JULY 8, 1908.
920,346.
Patented May 4, 1909.
5 SHEETS—SHEET 5.
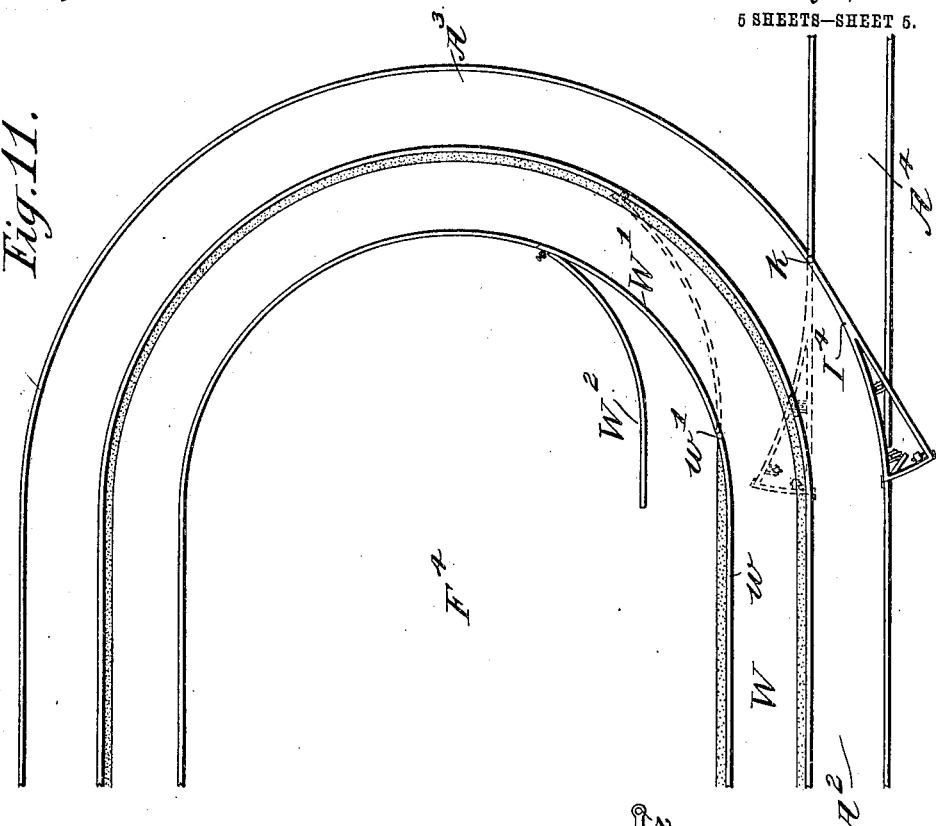
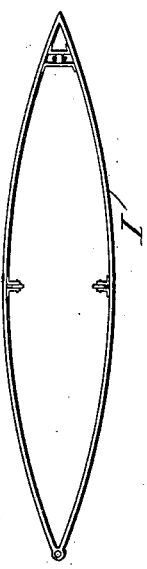
WITNESSES
INVENTOR
Ferdinand Kronenberger
BY
ATTORNEYS

UNITED STATES PATENT OFFICE.

FERDINAND KRONENBERGER, OF NEW YORK, N. Y., ASSIGNOR OF ONE-HALF TO ROBERT STEWART, OF BROOKLYN, NEW YORK.

RACE-COURSE.

No. 920,346.  Specification of Letters Patent.  Patented May 4, 1909.

Application filed July 8, 1908. Serial No. 442,502.

*To all whom it may concern:*

Be it known that I, FERDINAND KRONENBERGER, a citizen of the United States, residing in the city of New York, borough of Brooklyn, county of Kings, and State of New York, have invented certain new and useful Improvements in Race-Courses, of which the following is a specification.

This invention appertains to improvements in race courses, and embodies, among other features, means whereby the several horses in a race are caused to run under practically the same or uniform conditions; or, in other words, whereby each horse in the race is given an equal opportunity with the remaining horses, thereby conducing to true run races.

It is well known that in racing horses on courses, as customarily constructed, a horse who fails to " get off " properly frequently gets " pocketed," thereby practically destroying all his chances of winning; further, that the horse or horses on or near the outside of the track are compelled to run or cover much greater distances than those which run near the " rail " or inside of the track, and, accordingly, the horses do not run under anything like fair or equable conditions.

This invention overcomes the foregoing disadvantages in the race courses of the type now used, and, further, provides means whereby the horses and jockeys are under better surveillance of the judges or other officials as well as permitting the races to be viewed to the best advantage by the public.

Another feature of the invention is the provision for races at different distances, on the same track or course, even races at the longest distances, and yet have the horses at all times in full view of the officials and the public.

Broadly stated, the invention consists in constructing a race course, preferably of a double circular shape, or of an S-shape, and providing them, at suitable points, with certain devices, such as gates, in order to direct the path of the horses and cause them to run in circular, oval or straightaway courses, and yet compel each horse in the race to run substantially the same distance.

The gates aforesaid may be operated manually or by power driven mechanism, but I prefer to operate them from a central position or station, say the judges' stand, by an electric current controlled by suitable switches located in said station.

Further features of construction embodied in the invention, and the advantages thereof, will appear from the hereinafter detailed description.

In the accompanying drawings I have illustrated different practical embodiments of the invention, but the constructions shown therein are to be understood as illustrative, only, and not as defining the limits of the invention.

Figure 1 is a plan view of an S-shaped course with gates arranged thereon; Fig. 2 is a similar view of a double circular course with gates arranged thereon; Fig. 3 is a view showing the gates positioned on an S-shaped track and a diagrammatic arrangement of the electric circuits and apparatus for operating said gates; Fig. 4 is a vertical elevation, looking in the direction of the arrows, on the line 4—4 of Fig. 2; Fig. 5 is an elevation, partly in section, looking in the direction of the arrows, on the line 5—5 of Fig. 2 showing, particularly, a portion of a gate used on a circular course and the mechanism for operating the same; Fig. 6 is an end view, partly in section, of a straight gate; Fig. 7 is a plan view, on an enlarged scale, of a portion of a gate used on a circular course; Figs. 8, 9, and 10 are modified forms of gates, and Fig. 11 is a modified form of race course, adapted particularly for hurdle and steeplechase races.

The form of race track shown in Fig. 1 of the drawings consists of the semi-circular end sections, A, B, connected by the straightaway intermediate sections, C, D, and the cross section, E. The entire course incloses a field, F, F', which is crossed by the cross section, E. The inner margin of the semi-circular end sections, A, B, and the straightaway sections, C, D, is defined by a rail or fence, *a*, while the outer margin is marked by a similar rail or fence, *b*, whereas the limits of the cross section, E, are marked by rails or fences, *e*, *e'*, the latter meeting with or joining on to the fence or rail, *a*, substantially as shown in the drawings. Within the section, F', of the field is located the judges' stand, G, and the starting or finish line, or both, indicated at H is opposite to this stand.

I designates a gate which is arranged at the point where the rails, *a*, of the straightaway track section, C, meets the rail, *e'*, of the cross section, E, and a similar gate, J, is positioned at the point where the rail, $e$, of the cross section, E, meets with the rail, $a$, of the straightaway section, D. The gates, I, J, are similar in construction and mode of operation, and they are preferably of the swinging variety so as to extend across the straightaway sections, C, D, as shown in full lines in Fig. 1, or they may be adjusted across the ends of the cross section, E, as indicated in dotted lines in said Fig. 1, for the purpose of directing the racing horses through the straight sections, C, D, and into the curved sections, A, B.

An important feature of the invention consists in a double curved construction of the cross section, E, so that at one end the section, E, will open into one portion of the semi-circular section, B, at a point opposite the judges' stand, G, or substantially so, whereas the other end of said cross section, E, will open or merge into the other semi-circular section, A, at the opposite side of the longitudinal axis of the course.

The gates, I, J, are the same in construction and mode of operation so that a description of one will answer for the other. The gate is shown in detail in Figs. 4, 5, and 7 of the drawings, by reference to which it will be seen that each gate is in the form of a skeleton structure, preferably of metal, and housed within a wooden inclosure serving as a barrier. The metallic part of the gate is indicated at $j$, and the part constructed of wood at $j'$. At one end the parts of the gate are secured rigidly to a vertical tube or sleeve, $k$, and this sleeve is supported loosely on a vertical spindle, K, which is anchored as at $k'$ in the ground at a proper point. In one form of construction the lower part of the spindle, K, is provided with an enlarged foot, $k^2$, which is sunk in the ground and is secured firmly in place by a filling of plastic material, $k'$, such as of concrete, whereby the spindle, K, is anchored firmly in place at the proper point with relation to the section or sections of the race course. It is found that the gates must be quite long in order to extend across the sections of the race course, and in order to support the gate in position, it is preferred to provide each gate with one or more depending hangers, L, the latter being secured rigidly to the gate structure at suitable points intermediate its ends. The hanger or hangers, L, are provided with the caster wheel, $l$, adapted to travel on the surface of the race course for the purpose of supporting the weight of the gate.

The gates, I, J, are each used on a race course wherein a straight section and a curved section open or merge one into the other, and to enable the gates to be used to the best advantage at these points, I construct each gate with a curved side and with a straight side, the gate having a substantially tapering form in plan, substantially as shown in Figs. 1 and 2 of the drawings. As shown, each gate, I, J, is provided with a straight side, $i$, a curved side $i'$, and a transverse web or connecting portion, $i^2$, the straight and curved sides, $i$, $i'$, respectively merging into a common shank, $i^3$. The gate is of skeleton construction and its free or non-pivoted end is supported by a caster wheel, M, and a traction wheel, N. Said caster wheel is mounted in a bracket or hanger, $m$, which is fastened to the curved side, $i'$, of the gate, see Fig. 7. The traction wheel, N, has its shaft journaled in a hanger, $n$, supported on the connecting member, $i^2$, of the gate. This traction wheel may be provided with teeth or spurs, as shown in Figs. 5 and 6, to increase its frictional engagement with the ground, and said traction wheel is adapted to be positively rotated for the purpose of opening and closing the gate, all as will hereinafter more fully appear.

From the preceding description taken in connection with the drawings, it will be understood that the skeleton tapering gate is pivoted at one end by a sleeve fitting loosely on a fixed spindle, the latter positioned at the point where the rails or fences of a race course meet with each other, whereas the free or non-pivoted end of the gate is supported by caster wheels and a positively operated traction wheel. Each gate is mounted to swing or turn in a horizontal plane for the purpose of opening one section of the track and closing or intercepting another section of the track, and it is preferred to arrange said gate for swinging movement in a horizontal plane above the stationary fences or rails of the race course, whereby the gate when opened or closed is adapted to lie over a portion of the fence or rail track, see Figs. 4 and 5.

The gates, I, J, may be operated by any suitable means, either by hand or by power. In Fig. 4 there is shown one embodiment of hand-operated means, the same consisting of a crank, $o$, attached to a shaft, O, which is mounted in a suitable post, $o'$, adjacent to the spindle, K. Said crank shaft is provided with a gear, $o^2$, which meshes with a gear, $o^3$, that is secured on the tube or sleeve, $k$, whereby the gate may be operated by power applied to the pivotal support therein. It is preferred, however, to employ power operated means for opening and closing the gate, and to this end each gate is equipped with an electric motor whereby said gate may be opened and closed by the energy of electric currents derived from any suitable source of power, such as a central stationary dynamo, a battery or other source of electric energy. As shown, each gate is equipped with an electric motor, P, which is mounted on a part of the gate, preferably at its non-pivoted end. As shown in Figs. 4 and 5, the electric motor, P, is supported in a small bracket, $m^5$, attached to the gate, and the shaft of this motor is provided with a sprocket gear, $p$, the latter being engaged by an endless sprocket chain, $p'$, which extends to, and around, a sprocket gear, $P'$, that is fixed on the shaft of the traction wheel, N, whereby the motion of the electric motor shaft, P, is communicated directly to the shaft of the traction wheel, N, for the purpose of rotating the latter. It is preferred, also, to provide each gate with means for latching it in its opened and closed positions, and, furthermore, I prefer to electrically operate the latch mechanism for the purpose of unlocking the gate previous to swinging it from one position to another. Any suitable latch mechanism may be employed for this purpose, but in Fig. 3 the gate is shown as having two latches, Q, Q', each of which is mounted at one corner of the non-pivoted portion of the gate. As shown, each latch is adapted for sliding movement in a lug, $q$, of the gate, and said latch is provided with an armature, $q'$, the latter being acted on by an electro magnet, $Q^2$, also supported on the gate so as to have coöperative relation to the armature of said latch.

In Fig. 3 of the drawings, I have disclosed a simple arrangement of electric circuits whereby the latch devices of the respective gates, and the electric motors of said gates, may be operated from a central station, such as the judges' stand, G, or from a switch board adjacent to said stand. The motor, P, of the gate, I, is included in an electric circuit comprising the conductors, $r$, $r'$, and this circuit includes also a source of electric energy, such as the battery, R, and the double switch, R'. The electro magnets, $Q^2$, of the latch devices for the gate, I, are connected in series and included in an electric circuit consisting of the conductors, $s$, $s'$, which circuit also includes a battery, S, and a switch, S'. The gate, J, is provided with an electric motor, P, and the latch devices, Q, Q'. Said motor, P, of the gate, J, is in an electric circuit composed of the conductors, $t$, $t'$, including a battery, T, and a switch, T'. The latch devices, Q, Q', of the gate, J, are in an electric circuit consisting of the conductors, $u$, $u'$, and including a battery, U, and a switch, U'. The motors, P, on the gates, I, J, are of the reversible type, and the double switches, R', T', are so connected in circuit with said reversible motors that by adjusting each switch to one position, its corresponding motor will be driven in one direction, whereas the switch may be adjusted to another position for the purpose of driving the motor in an opposite direction, while a third adjustment of the switch will open both circuits so as to deënergize the motor.

The gates, I, J, of the race course shown in Fig. 1 may be adjusted to the full line positions so as to intercept the straightaway sections, C, D, and thereby compel the horses to travel through the cross section, E, of the track. The race may be started at any suitable point so as to bring the finish at or about the line H in front of the judges' stand, G. Assuming that the race is started at a point either in the straight section, C, or the curved section, A, the horses will be compelled to travel through the cross section, E, and finish in front of the stand, G. The horse having the inside of the track, next to the rail, $a$, will be compelled to follow said rail, $a$, whereas the horse on the outside of the track will have an opportunity in traveling through the section, E, to take the inside of the course, or that side next to the rail, $e$, before the finish takes place in front of the stand, G, whereby the inside and outside horses participating in the race will have an opportunity to change their respective positions relative to the course during the progress of the race, thereby equalizing the distance traveled by the horses on the inside and outside, respectively, of the course. It is evident that the latches of the gates withdraw by closing the circuits, and the switches of the motor circuits may be operated so as to energize the motors for the purpose of operating the traction wheels, N, whereby the gates may be moved from the full line positions of Fig. 1 into the dotted line positions of the same figure, thus bringing the straight sides, $i$, of the gates into alinement with the fences, $a$, in the straight sections, C, D, of the track, whereby the cross section, E, is closed and horses may travel in the longer track provided by the semi-circular sections, A, B, and the straightaway sections, C, D. When the gates, I, J, are adjusted to the full line position of Fig. 1, the curved sides, $i'$, of the respective gates form continuations of the curved rails or fences of the track sections, A, B, E, but when the gates are adjusted to the cross positions shown in dotted lines in Fig. 1, the straight sides, $i$, of the gates are in the direction of the straight sections of the tracks, whereby the horses are permitted to travel in the respective portions of the race course without injury from the gates, the latter being in substantially flush relation to the straight or curved sections of the race course. Under some circumstances the support for the swinging gate may bring the traction wheel, N, in the path of the racing horses, and to enable this traction wheel to be out of the way of the animals, I may employ, under some circumstances, the extensible construction shown in Fig. 6 of the drawings. The hanger, $n'$, for the toothed traction wheel, N, may be in the form of a sleeve adapted to receive the spindle, N', the latter having a jointed connection at $n^2$ with the gate. This spindle, N', is fitted to a coiled spring, N², which has a tendency to press the hanger, n', and the wheel, N, away from the gate, J, and on this spindle, N², is a stop plate, n³, the latter being adapted to engage with the gate in limiting the hanger to a rocking motion either to the right or left. The jointed connection, n², between the hanger and the gate, permits said hanger and the wheel, N, to assume the dotted line position of Fig. 6, whereby the traction wheel may be adjusted on the inside of the course and out of the way of the racing horses. If desired, the stop, N³, may be fixed in the ground at a point in the path of the traction wheel, N, for the purpose of arresting the movement of the gate in one direction.

In the form of race track shown in Fig. 2, the course is composed of the circular track sections, A', B', inclosing the field, F², F³, the circular sections, A', B', meeting or intersecting each other so as to have a portion, X, of the race course common to both of the circular sections. In conjunction with the circular sections the course is provided with the cut away sections, C', D', on the respective sides of the track, and these straight and curved sections are so positioned as to produce the triangular sections, Y, Y'. At the respective ends of the straightaway section, C', are the gates, I', I²; at the respective ends of the straightaway section, D', are the gates, J', J², and at the common section, X, are other gates, I³, J³. The gates, I', I², and J', J², are of the tapering construction heretofore described, each consisting of a straight side and a curved side united by a cross piece at one end and merging into a common shank at the other end, each of said four gates being pivoted at k. Said gates are provided with the single or double latch devices, and with the reversible motor mechanisms, all as heretofore described in connection with the construction of Figs. 1, 2, 3, 4, 5, and 7, whereby the latches may be electrically operated for releasing them, and the motors electrically operated for driving them in one direction or the other so as to move the gates from open to closed positions, and vice versa. The gate, I³, is preferably of the single bar type and it is arranged to be adjusted across the circular track portion, B', so as to close the communication between said track portion and the common section, X, said gate being pivoted at k⁵. The other gate, J³, is pivoted at k⁶ and is adapted to be adjusted across the track section, A', so as to close communication between said section, A', and the section, X, although the gates, I³, J³, may be adjusted to the dotted line positions in Fig. 2 for the purpose of permitting the racing horses to pass in the direction indicated by the arrows in said Fig. 2, whereby the horse on the inside of the course is caused to take a position on the outside of the course in passing across the section, X, the horses racing in almost a straight line from the section, B', across the section, X, and into the section, A', all as shown by the arrows. The several gates may be adjusted to a number of positions for the purpose of changing the direction of the course traveled by the horses, and for the purpose, also, of accommodating the track to races which vary in lengths, but in each of the several instances, the horses are compelled to change positions with respect to the inside and the outside of the course, and the races are always in full view of the judges and of the occupants of the grand stand.

The course shown in Fig. 1 employing a single cross section common to both semicircular sections requires the use of two gates only, such a course being described briefly as an S-shaped course, whereas the double circular course shown in Fig. 2 may be said briefly to resemble the number 8, and requires the employment of a number of gates, preferably six. The gates may be latched and released automatically, and operated electrically from a single station, or a number of stations, and in each instance the gate where it is used in connection with a straight and a curved section of a course should be provided with a straight and curved side, in order that horses may run against the gate without injury.

In Figs. 9 and 10 of the drawings, I have shown various forms of gates which may be used in connection with different types of tracks; thus in Fig. 9, the gate is provided with two bowed or curved sides, whereas in Fig. 10, the gate is provided with one straight side and one bowed side. It is intended that each gate shall be pivoted or hung at one end, supported by caster or traction wheels at the other end, and be equipped with the latch mechanism and with a reversible motor driving mechanism at the unsupported end.

Fig. 8 shows diagrammatically the arrangement of two gates, Z, Z', each hung or pivoted at one end as at z. The gates when closed may be latched or fastened temporarily at their meeting ends by any suitable form of latching device, z', said latching device being either operated by hand or automatically.

The race course shown in Fig. 11 of the drawings embraces in its construction an ordinary track for racing horses and a steeplechase course so constructed and arranged with relation to the ordinary race course that the horses participating in a steeplechase race may also run for a part of the distance in the ordinary race course, as well as in the field inclosed within the double track. The race course, A², has a semi-circular section, A³, preferably at each end, and with this race course, A², communicates a chute or straightaway starting course, A⁴. A gate, I⁴, constructed substantially as hereinbefore described, is pivoted at $k$ and is adapted to occupy the full line position of Fig. 11 so as to close the starting section, A⁴, or it may occupy the dotted line position with a view to opening communication between the portions, A², A⁴. The steeplechase course, W, is within the running or trotting sections, A², A³, of the usual course, and the inner rail, $w$, of the steeplechase course is broken or intersected by a gate, W′, the latter being hinged or pivoted at $w'$ so as to be adjustable to the dotted line position of Fig. 11, although it occupies usually the full line position so as to make the steeplechase course, W, continuous and within the usual race course, A², A³. Within this gate, W′, is a fixed barrier, W², and when the gate, W′, is in the dotted line position of Fig. 11, the steeple chase horses are compelled to travel from the steeplechase course, W, into the field, F⁴. As is usual, the removable barriers or hurdles are placed in the steeplechase course and in the field.

Having thus fully described the invention, what I claim as new, and desire to secure by Letters Patent is:

1. In a race course, a plurality of tracks, adapted to be placed in communication with each other and gates positioned on said tracks so as to connect said tracks or separate them.

2. In a race course, a plurality of tracks, and motor operated gates positioned on said tracks so as to connect said tracks or separate them.

3. In a race course, a double circular track having a portion of its path common to both circular courses, and gates for varying the shape of the track.

4. In a race course, a double circular track having a portion of its path common to both circular courses, and motor operated gates for varying the shape of the track.

5. In a race course, a plurality of tracks, and electrically operated means for directing the horses into any one of said tracks.

6. In a race course, a plurality of tracks, gates separating said tracks, and electrically operated means mounted in said gates for moving them so as to direct the course of the horses on said tracks.

7. In a race course, a plurality of tracks, a gate positioned so as to intercept any one of said tracks, electrically operated means mounted on said gate for moving it, and electrically operated latch mechanism for locking it in position.

8. In a race course, a plurality of tracks, a gate positioned to intercept said tracks, electrically operated mechanism mounted on the gate for opening and closing the same.

9. In a race course, a plurality of tracks, a swinging gate for directing the path of the horses, electrical means for operating said gate, and means for reversing the electric current through said gate so as to open and close it.

10. In a race course, a plurality of tracks, a gate intercepting said tracks, caster wheels for supporting the gate, and means for operating said gate.

11. In a race course, a plurality of tracks, a gate intercepting said tracks, caster wheels for supporting the gate, and traction means for operating said gate.

12. In a race course, a plurality of tracks, a gate intercepting said tracks, caster wheels for supporting the gate, and extensible traction means for operating said gate.

In testimony whereof I have signed my name to this specification in the presence of two subscribing witnesses.

FERDINAND KRONENBERGER.

Witnesses:
ROBERT STEWART,
J. F. BULLWINKEL.